July 29, 1969

H. WALD 3,458,810

REMOTE GROUP METERING OF ELECTRIC ENERGY FOR MULTISTORY
BUILDINGS WITH CURRENT TRANSFORMER

Filed Dec. 29, 1964

INVENTOR.
Herman Wald
BY

July 29, 1969  H. WALD  3,458,810
REMOTE GROUP METERING OF ELECTRIC ENERGY FOR MULTISTORY
BUILDINGS WITH CURRENT TRANSFORMER
Filed Dec. 29, 1964  2 Sheets-Sheet 2

INVENTOR.
Herman Wald

United States Patent Office 3,458,810
Patented July 29, 1969

3,458,810
REMOTE GROUP METERING OF ELECTRIC ENERGY FOR MULTISTORY BUILDINGS WITH CURRENT TRANSFORMER
Herman Wald, 97—11 Horace Harding Expressway, Queens, N.Y. 11368
Continuation-in-part of applications Ser. No. 147,416, Oct. 17, 1961, Ser. No. 166,837, Jan. 17, 1962. This application Dec. 29, 1964, Ser. No. 421,957
Int. Cl. G01r 11/32
U.S. Cl. 324—127                    13 Claims

ABSTRACT OF THE DISCLOSURE

The invention relates to a remote metering system for measuring energy supplied to load centers remote from a central location. The load centers may be located on the different floors of a multistory building. A plurality of power meters, each associated with an individual load center, are positioned at the central location. At each load center there is located a transformer having the secondary winding thereof connected through metering circuit means to the associated power meter at the central location. The primary winding of each transformer is connected in series between its associated load at the load center and a common power source supplying energy to the remote load centers to monitor the current delivered to the load center. Compensating means are provided to compensate for varying lengths of said metering circuits.

---

This application is a continuation-in-part of my copending applications Ser. No. 147,416 filed Oct. 17, 1961, now abandoned, and Ser. No. 166,837 filed Jan. 17, 1962, now abandoned.

More particularly stated, the methods and principles herein described are basically intended to be specifically employed in individual group metering installations for multistory buildings and to operate the system by using, in combination, calibrated current transforming devices for a given maximum burden and being adapted to deliver the metering current through unduly long secondary leads with acceptable accuracy and irrespective of the varying length of the secondary wiring imposing a correspondingly varying secondary burden on the current transforming device.

Individual group metering for multistory buildings require a wiring system with considerably long individual apartment feeders. These installations are expensive and produce high voltage drops unless the feeders are increased in size to compensate for this loss. Today's wiring methods employ a 3-wire feeder arrangement consisting of two different phase legs of a 3 phase-4-wire Y system which produce large unbalanced neutral currents despite balanced load distribution on both phase legs.

Employing recommended demand factors of 50%, 35%, respectively, to lighting and appliance loads connected to a common feeder supply, the cost of installation of feeders to individual apartments is approximately 100% greater than the common feeder type of installation used in master metering systems.

To partly reduce the above cost difference, meter banks are oftentimes installed on intermediate floors, however, suitable locations to be selected generally create difficult problems in building design and usually necessitates the sacrifice of valuable closet spaces and still unduly long horizontal runs cannot be avoided. This is not a solution of the problem since the long horizontal runs must always be used which cause appreciable voltage drops and carry unbalanced neutral currents as explained.

Since the modern trend is toward greater electrical loads, it is of paramount importance to introduce new methods of metering whereby the cost of individual group metering installation will approximate that of the master metering installation with all the advantages of common feeders previously noted.

One of the main objects of the present invention is to provide various methods for the application of current transforming devices to an individual group metering installation in multistory buildings. The metering system will be complete with all the necessary devices required for acceptable accuracy at a low cost and with simplicity of installation.

A further object of the invention is to provide an adjustable matching resistor element at the location of the metering equipment to compensate for the varying secondary leads or burdens due to the respective load panels located at various floor levels. Such a matching arrangement will result in a constant operating burden for all current transformers of the group, and all the current transformers can be initially calibrated at the factory for a given maximum constant operating burden.

A specific object of the invention is to operate the current transformer as a summation unit to carry two different phase currents of a Y-connected 3 phase 4 wire system to make possible the usage of a 2-wire meter measuring the true power consumption of the loads connected to both phase legs.

Another important object of the invention is to provide a phase shifting current network to shift one phase current by 60 degrees and then reversing it, thereby to bring both phase currents in full phase coincidence as required for correct summation. An alternate method would be to shift both phase currents by 30 degrees lag and lead, respectively, to bring both phase currents in full phase coincidence, (with the phase-to-phase voltage vector).

Another object of the present invention is to provide a method for converting an existing master meter installation in multistory buildings into individual group metering without any change to the existing power feeder system.

Another important objective of the invention is to provide an inverse transformation of the secondary metering current to normal rated primary current by means of an additional plain current transformer connected in the secondary metering circuit directly ahead of the meter. This provision permits the useage of a conventional primary rated watthour meter instead of a transformer rated meter specially designed for 1 ampere operation.

A final object of the invention is to provide a combined linear compensation for the overall errors of both the main and inverse current transformer by calibrating each for a given but different percentage of the maximum input current rating, thereby to obtain a flat error curve.

Further objects of the invention lie in the combination of the various above mentioned arrangements to form a complete remote group metering system and also include the various subcombinations of the elements and their interrelation.

The objects of the invention will become more evident from the detailed descriptions presented in conjunction with the accompanying drawings and for better understanding reference will be made to them, in which.

Figure 1:
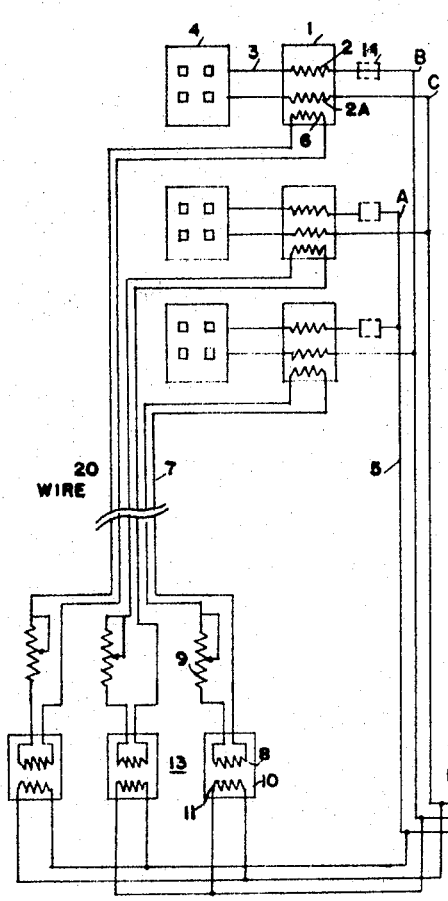
FIGURE 1 is a diagrammatic illustration of a complete remote group metering arrangement including current transformers as applied to multistory buildings.
Figure 1A:
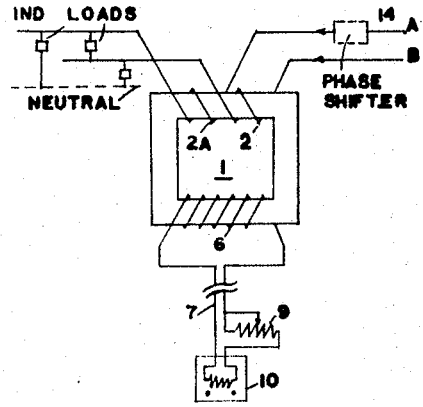
FIGURE 1A illustrates a preferred circuit diagram of a summation current transformer using a 60 degree phase shift.
Figure 1B:
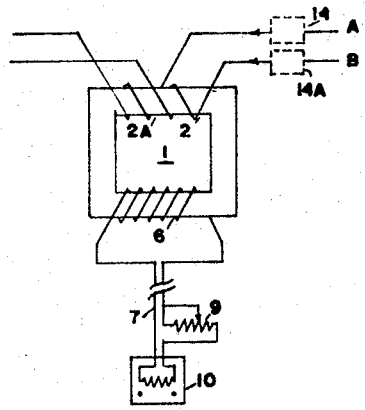
FIGURE 1B illustrates the circuit diagram of a summation current transformer using 30 degrees shift for each phase current.
Figure 1C:
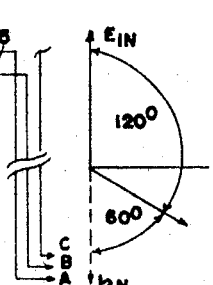

FIGURE 1C indicates the vector relationships of a 60 degrees shifting method.

Figure 1D:
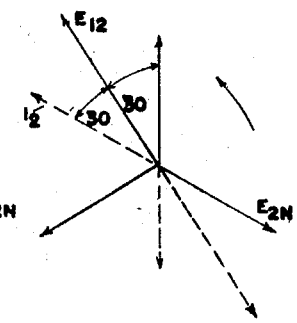

FIGURE 1D indicates the vector relationships of two 30 degrees shifting method.

Figure 2:
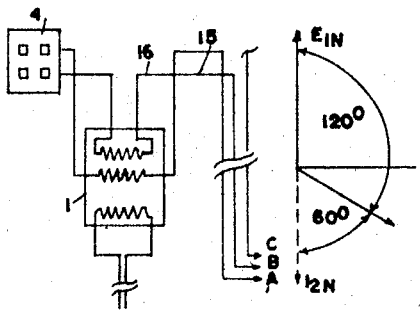

FIGURE 2 shows a diagrammatic view of a method of converting any existing master meter installation to individual remote group metering in multistory buildings.

Figure 3:
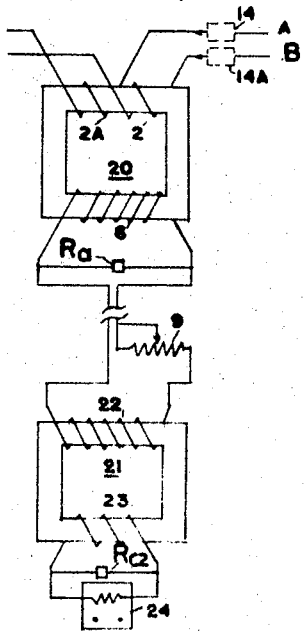

FIGURE 3 is a diagrammatic view of a combined current transformer system employing an additional current transformer in cascade to provide an inverse transformation of the metered current.

Figures 3A, 3B:
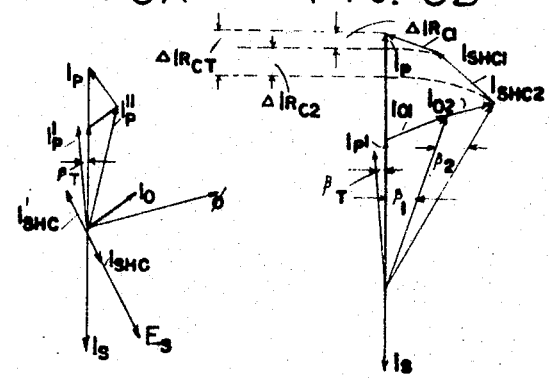

FIGURE 3A shows the vector relationships of the compensating currents to produce an overall error curve of linear character.

FIGURE 3B is another vector diagram illustrating the combined action of the compensating currents.

Figure 3C:
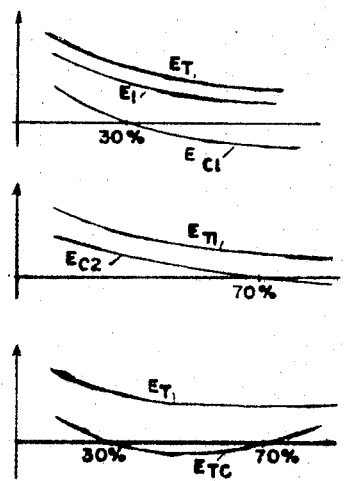

FIGURE 3C illustrates the various error compensating curves produced by the shunt compensating method described in FIGURES 3A and 3B.

Figure 4:
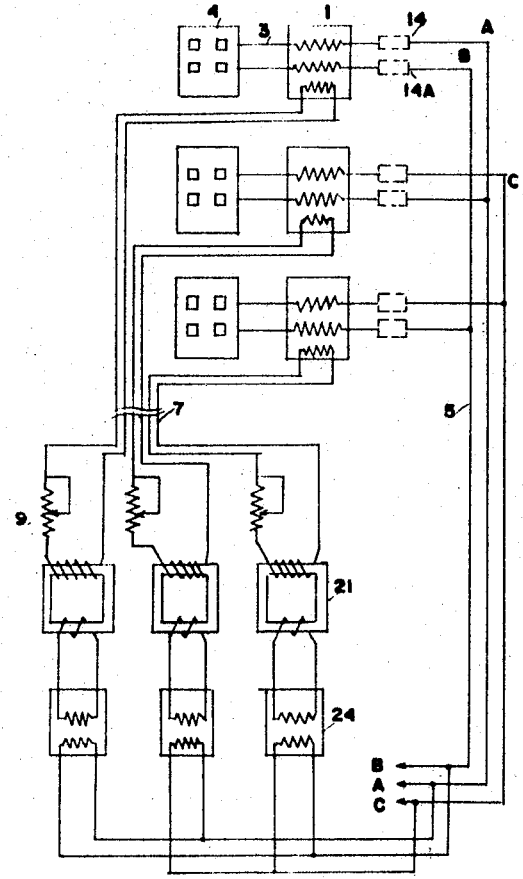

FIGURE 4 represents a complete remote metering arrangement showing the application of the inverse transformers at the metering location.

Referring more particularly to FIGURE 1 in which a diagrammatic view of a complete remote group metering system is given in accordance with the invention as applied to multistory buildings. In this application, the specific feature of the invention lies in the fact that the current transformer is located at the load point or in proximity thereof where the electric power is supplied through the primary of the current transformer, whereas its secondary carrying the metering current though the unduly long secondary leads is connected to the remotely located watthour meter. It is quite clear that this method of the invention differs from all prior methods in the present art locating the current transformer in proximity of the watthour meter as required for accurate metering.

It is to be understood that a current transformer of a specific design must be employed in order to deliver the metering current with substantially constant ratio despite the considerable burden imposed upon the current transformer by the varying length of the extended secondary wiring. It is noted that the method of adjusting the burden of all secondary leads of the group to a substantially constant operating value considerably improves the accuracy of the current transformers.

In FIGURE 1 reference character 1 denotes an alternating current transformer of the summation type having two primary windings 2, 2A, respectively, to operate in conjunction with a 3 wire feeder system of either a 120–240 volt or 120–208 volt type. For the sake of illustration three identical system arrangements are shown and are denoted by like reference characters. One end or load side of the primary windings 2, 2A is connected with shortest leads 3 into the load panel indicated at 4. The other ends or line side thereof are connected to the respective phases of a vertical common riser feeder 5 having the phases A, B, C to serve as a common feeder with branches tapped to the respective current transformers.

The secondary winding 6 of the current transformer 1 carries the metering current and is connected by long leads denoted by the numeral 7 to the respective current coils 8 of the remotely located watthour meters denoted by the reference numeral 10. Since the current transformer is selected to have a rating of 1 (one) ampere, the secondary leads carrying the metering current will preferably be #20 A.W.G. wire size and thus 20 load panels may be metered by conductors installed in a 1″ conduit. This wiring method is an important aspect of the invention and will greatly reduce the cost of the remote group metering installation.

Reference numeral 9 denotes a variable potentiometer type resistor being inserted in series with the secondary leads 7 in the proximity of the remotely located watthour meter 10. Thus each potentiometer is individually adjusted to supplement the difference in the resistance between the various length of the secondary leads due to different floor levels. Thereby all operating burdens are made substantially constant to allow an accurate operation of the respective current transformers designed for a given maximum fixed burden.

In order to simplify the installation, the potential coil 11 of the watthour meter 10 will be connected by conductors 12 directly to the main power feeders located in the vicinity of the meter bank indicated at 13. Thereby the long runs for the voltage connection which are usually taken off at the point of the current supply are eliminated.

The phase shifting devices denoted by the reference numerals 14, 14A are inserted in series with the phase lines A, B, respectively. When the power supply is a 120–240 volt type of system, the phase shifting devices are omitted since both line currents are of the same phase. Obviously, unless a separate current transformer is used for each phase, the phase shifting devices must be used in connection with a 120–208 volt supply in order to shift both phases to full phase coincidence required for correct summation by the current transformer.

FIGURE 1A illustrates a preferred circuit arrangement of the summation current transformer connected to a 2-wire watt hour meter shown on FIGURE 1 as applied to a 3-wire feeder system using two primary windings 2, 2A. Thus the metering current in the secondary of the current transformer is proportional to the arithmetic sum of the phase currents in the primaries of a 120–240 volt 3 wire supply and for a 120–208 volt 3 wire supply when the phase currents are shifted for full coincidence. As a result, the combined effect of the primaries acting upon one single secondary enables a two-wire single stator meter to indicate the sum of the individual loads on two different phase legs. All identical parts shown in FIGURE 1 will be denoted in this FIGURE 1A by like reference characters. There is shown only one phase shifting device 14 which is applied in the case when the potential coil 11 of the watthour meter 10 is connected to 120 volts and neutral.

FIGURE 1B illustrates the same circuit arrangement as that shown on FIGURE 1A with the distinctive feature two phase shifting devices 14, 14A are used and each connected in series with the respective line current. This method is applied when the potential coil 11 of the watthour meter 10 is connected to the 208 volt terminals as it will be explained in a more detailed manner in connection with the vector diagrams of FIGURES 1C, 1D.

FIGURES 1C, 1D represent the vector relationships of the various phase shifting methods. In order to clarify the necessity of the phase shifting we will introduce the requirements for correct summation of two line currents. It is assumed that each primary has the same rated current with the rated secondary current $I_s$, preferably 1 ampere. The corresponding number of turns on the primaries are denoted by $N_1$, $N_2$ and the number of turns on the secondary is denoted by $N_s$. For true summation the current in the measuring secondary circuit must be a consistent fraction of the vector sum of both line currents flowing through the primaries $P_1$, $P_2$. This means that when both primaries are carrying full load, the ampere turns contributed by each to the summator must be proportional to the overall ratio. It follows that the total ampere turns on the primaries bear the same proportion to the sum of both rated primary line currents. In this type of application the 3-wire feeder may consist of a single phase 120–240 volt delta system or 120–208 volt open Y of a 3 phase 4 wire supply system.

(a) 120–240 volt supply.—In this case both feeders carry the same phase of a polyphase system. Let the instantaneous value of both primary currents be $I_{p1}$, $I_{p2}$, the corresponding secondaries would be $I_{s1}$, $I_{s2}$, respectively. If the total secondary instantaneous current is denoted by $I_m$ and the secondary turns are $N_s$, equating ampere turns on the primary and secondary side of the summation transformer, we get:

$$I_m N_s = I_{s1} N_1 + I_{s2} N_2 = (I_{p1}/K_c) N_1 + (I_{p2}/K_c) N_2$$

where $K_c$ is the ratio of the transformer. If the values of the turns $N_1$, $N_2$ are equal, then:

$$I_m N_s = \frac{(I_{p1} + I_{p2}) N_1}{K_c}$$

thus it is evident that the metering current is the vector sum of the currents in both feeders referred to a given ratio factor. Accordingly the combined effect of both primaries acting upon a single secondary permits the use of a two wire single stator meter for indicating the sum of the individual loads connected to two separate circuits.

(b) 120–208 volt open Y.—In this case the two line currents of the 3 wire feeder consists of two different phases of the 3 phase 4 wire system supply. To use the current transformer as a summation unit for phase currents 120 degrees out of phase from each other, it is necessary to apply a phase shifting device to bring both line currents in phase coincidence. With the two different phase currents shifted into phase with each other both phase currents add arithmetically in a manner described for the case of 120–240 volt supply.

There are two basic methods to accomplish such phase shifting. The first consists of shifting only one line current and the phase-to-neutral voltage is applied on the potential coil of the two-wire watthour meter. The second method consists of shifting both line currents and the phase-to-phase voltage is applied on the potential coil of the meter.

The vector diagram shown on FIGURE 1C indicates a 60 degrees lag shift of one line current. The detail of the phase-shifting device itself is not shown here since only its general application and circuit connection to remote group metering using line currents of different phases is claimed. Therefore only the operating vectors of such shifters are illustrated.

A 60 degrees lag shift will be obtained by proper selection of the ratio of the inductance L to the resistance R of the current shifting device and the corresponding primary winding shall be reversed in direction for the necessary phase coincidence with the other line surrent. Referring now to the vector diagram, a counterclockwise direction is assumed. On the diagram the two phase-to-neutral voltages are denoted by $E_{1N}$, $E_{2N}$, and the corresponding line currents $I_{1N}$, $I_{2N}$, respectively. Assuming, for the sake of simplicity of illustration, a unity power factor of the load. The reversed $E_{2N}$ is denoted by dotted lines. $I_{2N}$ will be shifted to lag $E_{2N}$ by 60 degrees and for full coincidence of both phase currents $I_{1N}$, $I_{2N}$, the corresponding primary winding is reversed.

The vector diagram shows also the case when the power factor of the load causes a $\phi$ degree phase displacement of the line current $I_{2N}$, consequently the shifted current will also assume the same lag angle $\phi$ with the reversed $I_{1N}$ and therefore the power delivered to the load will be identical.

It is an important feature of the phase shifting method that a proper phase sequence of the respective line currents must be maintained in order to accomplish the desired correct shifting as required for summation.

When a load is connected to the phase-to-phase voltage, not shown on diagram, the same 60 degrees shifting will provide the correct vector sum of both line currents with the potential coil of the meter connected to the phase-to-neutral voltage. Assuming a unity power factor load, the $E_{1N}$ lags the phase-to-phase voltage $E_{12}$ by 30 degrees, $I_1$ leads $E_{1N}$ by 30 degrees and $I_2$ leads the reversed $E_{2N}$ by 30 degrees. Since the shifted current lags $I_2$ by 60 degrees, its reversal will lag $E_{1N}$ by 30 degrees. Accordingly we find the same vector relations we obtained when the load was on the phase-to-neutral voltage. Thus both the one line current and the shifted-reversed one have the same 30 degrees angle with respect to $E_{1N}$ and therefore the vector sum is identical when phase-to-phase connections are made.

The vector diagram of FIGURE 1D illustrates the condition when the 208 volt phase-to-phase voltage is applied on the potential coil of the watthour meter. We see that $I_{1N}$ lags and the reversed $I_{2N}$ leads the $E_{12}$ voltage vector by 30 degrees. In order to obtain full phase coincidence with the $E_{12}$ voltage vector, both line currents must be shifted by the mentioned 30 degrees lead, or lag. It is understood that either the phase-to-phase or phase-to-neutral load currents will correctly add irrespective of the power factors of the respective loads as required for true power measurement.

FIGURE 2 shows a diagrammatic illustration of another method of the invention for converting any existing master meter installation with common feeder to an individual group metering arrangement. The novel metering system makes such a conversion possible without any alteration of the existing power feeder system. Note that all omitted parts or circuit elements are identical with those shown on FIGURE 1. Like parts are denoted by like reference numerals.

In this application, the existing subfeeder leads 15 connecting the riser feeder to the load panel shall be cut off at the point 16 for insertion of the current transformer 1 in series with the apartment load panel in accordance with the invention, as shown on FIGURE 1. It is to be understood that the secondary metering current carrying conductors to the watthour meters are similar to that shown on FIGURE 1.

FIGURE 3 is a diagrammatic view of a modified circuit arrangement applied to remote group metering by using one single current transformer as an upper stage unit generally indicated at 20 and an additional inverse or lower stage current transformer generally indicated at 21 in cascade connection having a primary winding 22 with a large number of turns in series with the main burden and a secondary winding 23 of a few number of turns, due to the inverse transformation, the turn ratio shall be inversely identical with that of of the upper stage transformer for producing a final current of magnitude being equal to the primary input current of the upper stage transformer. Thus the secondary winding 23 of the lower stage current transformer feeding the metering equipment 24 will carry the final output current of high magnitude allowing the usage of a conventional watthour meter. Thus this inverse method simplifies the requirements for installing the remote metering system by using a conventional 2-wire meter instead of a special type of 1 ampere meter. All like parts of this figure being identical with that of FIGURE 1 are denoted by like reference characters.

A compensating shunt impedance denoted by the reference character $R_{c1}$ is connected in parallel with the secondary winding 6 of the upper stage current transformer to compensate for errors at a particular point of its operating range. Similarly the other compensating impedance denoted by the reference numeral $R_{c2}$ is connected in parallel with the secondary winding 23 of the lower stage current transformer for compensating its errors at another selected point of its operating range. It is understood that at first some sort of turn-adjustment must be applied for correcting the general errors of the current transformer before this additional compensating means is employed. In the following linear compensating method applied to each current transformer is intended to induce a corrective current into the secondary circuit to supply the losses or to compensate the exciting current at a particular point of the load current range to produce a flatter error curve throughout the current range. A large shunt impedance across the secondary usually reduces the phase angle error and increases the ratio error which in turn can be corrected further by turn-adjustment.

This invention, therefore, contemplates to provide a combined linear compensation of the overall errors of both the upper and lower stage current transformers. Accordingly it is intended to compensate the ratio and phase errors of the overall error curve at approximately 30% of the operating range by corresponding adjustment of the compensating impedance $R_{c1}$ and turn ratio of the upper stage current transformer and similarly to adjust the lower stage current transformer at 70% of the operating current range. The reason for selecting the 30% and 70% points lies in the fact that in general the maximum load current in this application runs at about 80% of the maximum rating, therefore these two points are the most suitable to produce an approximate flat error curve throughout the useful operating range.

FIGURE 3A represents a vector diagram illustrating the corrective effect of a relatively high shunt impedance across the secondary of the current transformer. In this diagram $E_s$ denotes the secondary induced voltage, $\phi$ denotes the flux vector, $i_o$ is the exciting current vector, $i_s$ is the secondary current vector, $i_{shc}$ signifies the corrective shunt current vector. By adding the exciting current component $i_o$ to the primary current component $I'_p$ it will balance the secondary load current $i_s$ giving a resulting primary component current $I''_p$ which would be present if the shunt impedance were not connected. However, with the shunt impedance $R_{c1}$ connected to the secondary, it will carry a shunt current $i_{shc}$ in phase with $E_s$. As a result it will be balanced by an opposite component current $i'_{shc}$ in the primary winding and by adding same vectorially to $I''_p$ we obtain the actual final primary current, $I_p$. It is clear that the addition of the corrective shunt current will increase the primary component but it will greatly decrease the phase angle $\beta_t$. Therefore the ratio can be corrected by any type of turn adjustment method known in the art to operate the current transformer with substantially zero ratio error at a selected given 30% of the rating and the phase angle will become negligibly small at this current rating.

FIGURE 3B represents a vector diagram of the combined linear compensation of the overall error curve of both the upper and lower stage current transformers. In this diagram there is shown that the additive effect of both corrective shunt currents $i_{sh1}$ and $i_{shc2}$ flowing through the corrective impedances $r_{c1}$, $r_{c2}$, respectively, results in a final primary output current $I_p$ and phase error angle $\beta_t$. By inspecting the diagram we see that the fixed ratio errors of the upper stage and lower stage current transformers can be corrected by turn adjustment to produce the desired corrective amplitudes $\Delta i_{rc1}$, $\Delta i_{rc2}$, respectively, whereby the correct overall ratio current $I'_p$ is obtained. Although both corrective steps are effected independently at 30% and 70% of the overall errors, they are to certain extent interdependent and therefore a trial-error method must be applied and balanced against each other until the desired final adjustment is obtained. Accordingly at the individual current transformer adjustments, the setting shall be at first somewhat below or above the 30% point of the overall error curve and similarly the other below or above the 70% setting point. Thereafter by mutually balancing steps the approximate correct compensations can be obtained.

FIGURE 3C illustrates the various error compensating curves produced by the above described shunt compensating procedure. As we noted heretobefore, all the error curves will illustrate only the phase angle errors vs. current rating, since the ratio errors can be compensated by fixed turn adjustment or shunting some portion of a given small number of secondary turns.

The first plot diagram indicates a zero phase angle error at 30 percent rating. For the total overall error curve $e_t$ and second stage current transformer error curve $e_2$ the phase error is not zero, however, the error curve $e_1$ of the upper stage transformer crosses at 30% the rating line which is zero error. The second plot illustrates the same condition of error compensation for the lower stage transformer where the error curve $e_2$ crosses at 70% the rating line. The third plot diagram indicates the resulting overall error curve $e_{tc}$ as compensated for both operating points at 30 and 70%. The resulting error curve has a substantially flat characteristic within the operating range.

FIGURE 4 represents a complete remote metering set-up for multi-story building application having three identical units as shown on FIGURES 1, 1A or 1B. In this embodiment the upper stage current transformer is a single core type construction and similarly the lower stage transformer connected as an inverse transformer having the variable matching resistor element located at the meter.

Otherwise all similar parts are indicated by like reference characters.

The invention is not to be limited to or by details of construction of the particular embodiments thereof illustrated by the drawings as various other forms of the device will of course be apparent to those skilled in the art without departing from the spirit of the invention or the scope of the claims.

What I claim as new and desire to secure by Letters Patent of the United States is:

1. An alternating current remote group metering system to measure alternating current energy in two phases of a 120–208 volt three phase Y distribution system having a plurality of power metering circuits each comprising: a power meter at a first location, said power meter having at least one current winding and at least one potential winding; a load center at a second location remotely spaced from said first location; a common polyphase power supply for said power metering circuit extending between said first and second locations and being connected to said load center for delivering A.C. energy thereto and to said power meter potential winding; a current transformer unit at said second location having at least one primary and at least one secondary winding, said primary winding being in series with said load center, whereby current flowing from said power supply to said load center passes through said primary winding; a secondary current metering circuit extending between said current transformer unit and said power meter, said secondary winding being connected to said power meter current winding by said secondary current metering circuit; each of said current transformer units of said power meter circuit positioned at second locations of varied spacing to said first location causing varied lengths of said respective current metering circuits, whereby each of said metering current circuits constitutes different operating burdens on said current transformer units; and compensating means associated with each of said power meter circuits for obtaining improved accuracy of said current transformer units operating on said different burdens.

2. A remote group metering system according to claim 1, wherein said system measures energy in two phases of a 120–240 volt three phase distribution system.

3. A remote group metering system according to claim 1, wherein the intensity of current flow in said secondary winding is materially less than the current flow in said primary winding, and said compensating means comprises a current transformer unit of higher quality core material to operate same on the substantially straight portion of its magnetizing curve.

4. A remote group metering system according to claim 1, wherein said compensating means further comprises an adjustable impedance means included in said current metering circuit for adjusting the impedance of said current metering circuit to a predetermined value equalizing all said different burdens.

5. A remote group metering system according to claim 4, wherein said current metering circuit comprises at least two conductors, and in which said adjustable impedance means is an adjustable resistor serially included in one of said conductors.

6. A remote group metering system according to claim 1 wherein said load centers constitute a load distribution panel on each floor of a multistory building.

7. A remote group metering system according to claim 1, wherein said current transformer unit further comprises a phase shifting means to bring the existing 120 degrees phase angle between said two phases in full phase agreement for accurate summation by said current transformer unit.

8. A remote group metering system according to claim 7, wherein said current transformer unit comprises two primary windings and said phase shifting means comprises a current phase shifting network in series with one of said primary windings to shift the phase of one of said phase currents for full phase coincidence with the phase of said other phase current corresponding to the phase-to-neutral voltage of said other phase current.

9. A remote group metering system according to claim 7, wherein said current transformer unit comprises two primary windings and said phase shifting means comprises a current phase shifting network in series with each of said primary windings to shift the phase of each of said phase currents for full coincidence with the corresponding phase-to-phase voltage of said two phase currents.

10. A remote group metering system according to claim 1, wherein said current transformer unit further comprises an upper stage current transformer at said second location having two primary and one secondary winding; a lower stage current transformer at said first location having one primary and one secondary winding, the secondary winding of said upper current transformer being interconnected with the primary winding of said lower stage current transformer, the secondary winding of said lower stage current transformer being connected to said power meter, thereby to provide an inverse transformation permitting the usage of a conventionally rated power meter.

11. A remote group metering system according to claim 1, wherein said compensating means comprises a first shunt compensating impedance connected in parallel to secondary winding of said upper stage current transformer; a second shunt compensating impedance connected in parallel to the primary winding of said lower stage current transformer; said first compensating impedance adjusted to provide error compensation at a selected lower limit percentage of current rating; said second shunt compensating impedance adjusted to provide error compensation at a selected higher limit percentage of current rating, thereby to provide a substantially flat error curve within the operating range of said current transformer unit.

12. A remote group metering system according to claim 1, wherein said metering system is applied to an existing master meter installation of a multistory building having a common power feeder to all said load centers, thereby to provide an individual metering of said existing load centers.

13. A remote group metering system according to claim 1, wherein said current transformer unit comprises one current transformer for each phase of said two phases and one connected metering circuit for each said current transformer.

References Cited

UNITED STATES PATENTS

| | | | |
|---|---|---|---|
| 1,688,858 | 10/1928 | Drewry | 324—107 |
| 2,009,708 | 7/1935 | Shuck | 324—107 |
| 2,513,891 | 7/1950 | Petzinger et al. | 324—107 |
| 2,573,407 | 10/1951 | Coleman | 324—107 XR |
| 2,905,900 | 9/1959 | Lipscomb | 324—127 |
| 2,966,629 | 12/1960 | Downing et al. | 324—107 |
| 3,024,416 | 3/1962 | Becker | 324—107 XR |

RUDOLPH V. ROLINEC, Primary Examiner

G. R. STRECKER, Assistant Examiner

U.S. Cl. X.R.

324—107, 141, 142